March 26, 1940.   R. E. MATHES   2,194,509
SYNCHRONOUS MOTOR DRIVE FOR MULTIPLEX SYSTEMS
Filed Sept. 17, 1936   2 Sheets-Sheet 2
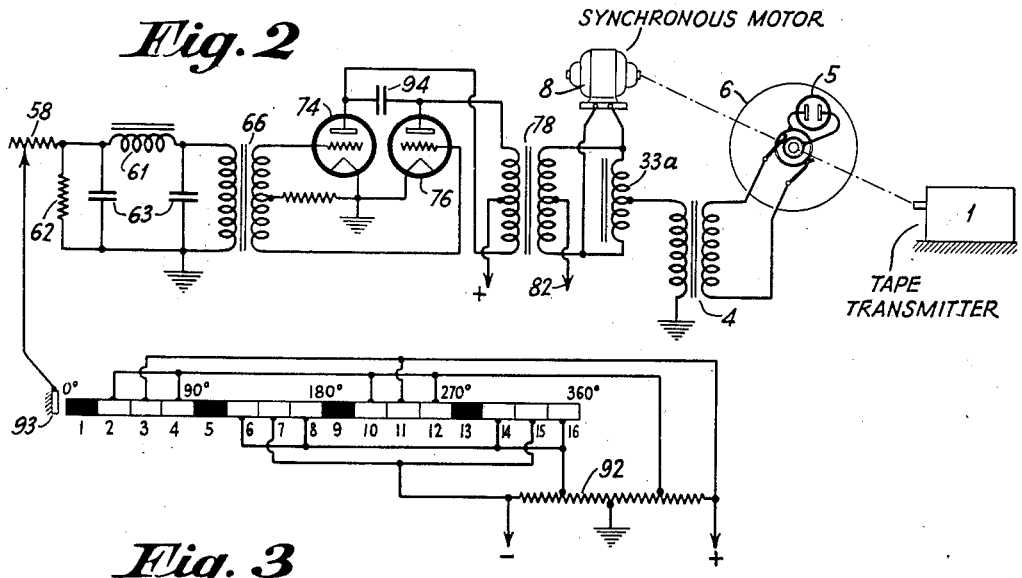
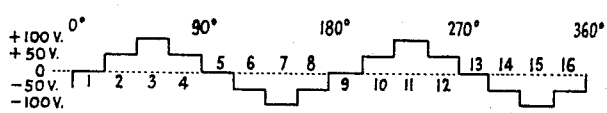
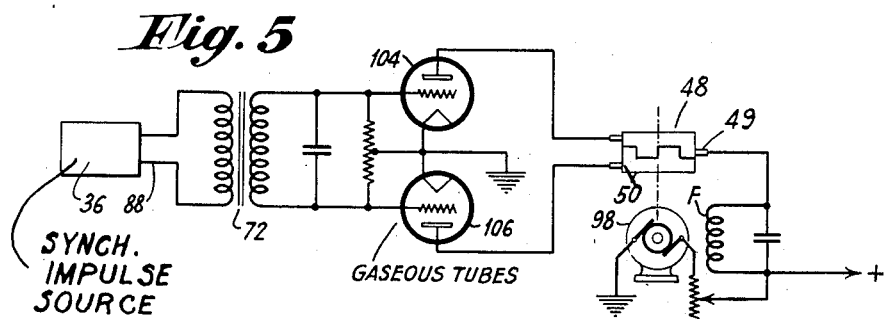
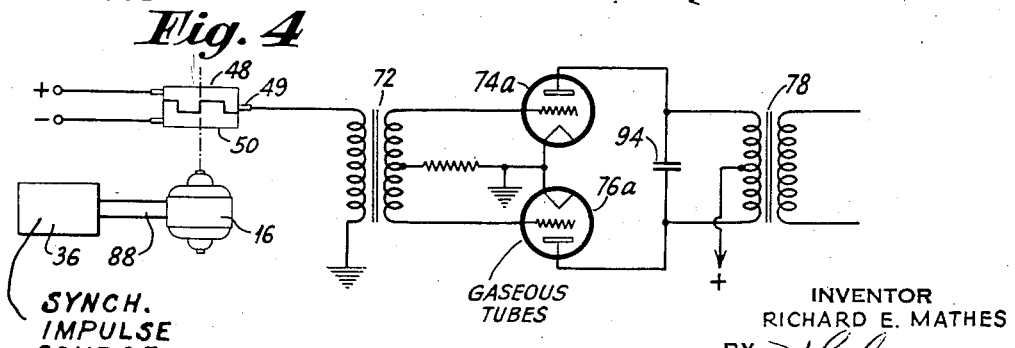
INVENTOR
RICHARD E. MATHES
BY
ATTORNEY Patented Mar. 26, 1940

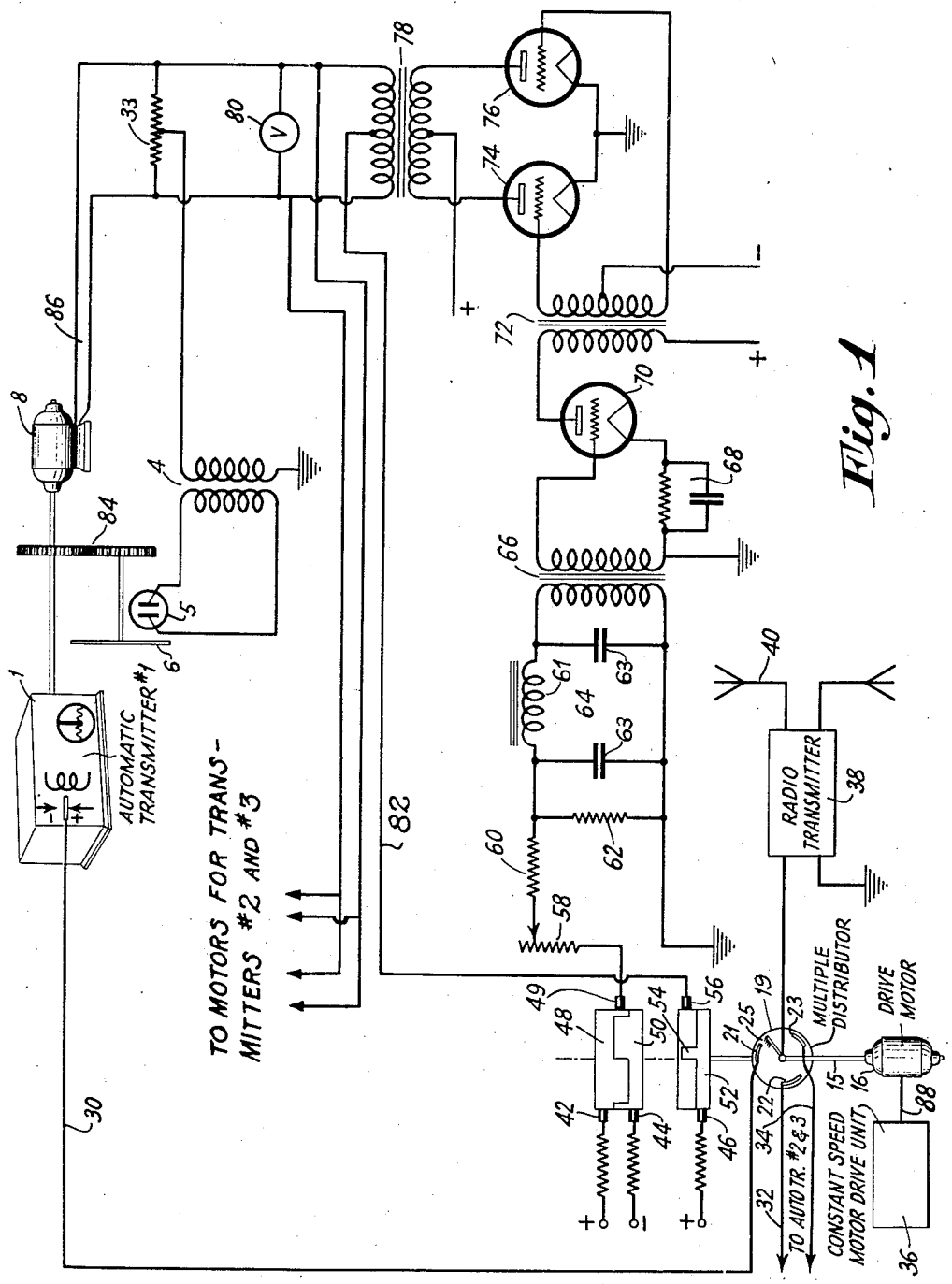

2,194,509

UNITED STATES PATENT OFFICE 2,194,509

SYNCHRONOUS MOTOR DRIVE FOR MULTIPLEX SYSTEMS

Richard E. Mathes, Westfield, N. J., assignor to Radio Corporation of America, a corporation of Delaware Application September 17, 1936, Serial No. 101,204

16 Claims. (Cl. 178—53)

This invention relates to synchronous motor drives for multiplex communications systems and has in particular to do with arrangements for maintaining the several transmitting units of a multiplex system in synchronism and properly phased with respect to each other.

In communications systems, particularly on radio channels, it has been found that an interchangeability of units is very desirable in order that the channel may be employed at times for printing telegraph code signal transmission and at other times for Morse code. The apparatus herein disclosed provides such interchangeability of the transmitters so that a time division multiplex system may be enabled to utilize a communications channel to its full capacity.

It is among the objects of my invention to provide a novel type of synchronous motor drive applicable to each of a plurality of perforated tape transmitters feeding to a multiplex channel.

Another object of my invention is to provide means for converting direct current to alternating current and thereby to drive a plurality of synchronous motors and to provide means for maintaining said motors correctly phased and in synchronism with a multiplex distributor on which the code signals from the tape transmitters are to be impressed.

Another object of my invention is to provide means for insuring that the signalling impulses from different tape transmitters shall be fed to a multiplex distributor in proper phase with the rotation of the distributor brush over the distributor segments.

Another object of my invention is to provide means responsive to periodic impulses for controlling the speed of a direct current motor.

Another object of my invention is to provide a suitable filter system and amplifier whereby square waves arising from the use of a pole changing commutator are converted into suitably shaped waves for driving a synchronous motor.

Another object of my invention is to provide suitable stroboscopic monitoring means for determining the correctness of phase adjustment of each transmitter motor with respect to the multiplex distributor.

The foregoing and other objects and advantages of my invention will be more readily understood, as well as the details of construction and operation of the invention itself, from the following description when read in connection with the accompanying drawings, in which Figure 1 shows diagrammatically one embodiment of the invention wherein two motors are kept in synchronism by means of a special circuit arrangement for converting direct current into alternating curent;

Fig. 2 shows a similar circuit with modifications;

Fig. 3 is a curve diagram indicating the potentials to be applied on different segments of the commutator otherwise shown in Fig. 2;

Fig. 4 shows still another modification in which gas-filled electron discharge tubes may be employed; and Fig. 5 shows an embodiment of the invention adapted for controlling the speed of a direct current motor.

Referring to Fig. 1, the usual multiplex distributor 19 is shown having in this illustrative case three transmitting segments 21, 22 and 23, each segment being allotted to the traffic which originates at its appropriate source. One of these sources is shown as automatic tape transmitter 1. The details of construction of such a transmitter are well known in the art.

A rotative driving means is provided for feeding the perforated tape, for actuating the code signalling device under control of the perforations in the tape, and for consecutively or selectively closing different contactors representing the several elements of a signalling code combination, so that marking and spacing impulses may be sequentially fed through the conductor 30 to the transmitting segment 21, and thence impressed upon the communications channel during the time that the brush 25 traverses the segment 21.

The apparatus thus far described is such as to key the operation of a radio transmitter 38, thereby to radiate signals from the antenna 40. In place of a radio transmitter it is obvious that a communications channel of any other type including a land-line conductor or a submarine cable may be used, if desired.

For the sake of simplicity in the drawing, the showing of the automatic transmitter 1 has not been duplicated for other transmitters, such as would normally be employed in a multiplex system. It is to be understood, therefore, that the conductor 32 connecting with the segment 22 may be fed with traffic signals in the same manner as that contemplated with respect to the conductor 30. A third multiplex channel, and in fact any additional number of multiplex channels like that shown by the conductor 34 connecting with the segment 23 may also be employed in the multiplex system.

The distributor 19 may be driven by any suitable motor 16, the speed of which is preferably regulated by any of the well-known means conventionally shown at 36 as a constant speed motor drive unit feeding current through the conductors 88 to the drive motor. For example, the unit 36 may be an alternating current generator the frequency of which is controlled by a tuning fork. In this case, the drive motor 16 would be a synchronous motor.

Mounted on the same drive shaft 15 with the distributor 19 is a polarity changing commutator consisting of conductive members 48 and 50. Positive current from any suitable direct current source may be fed to the brush 42 while negative current is fed to the brush 44. The positive and negative signs are indicative of potentials with respect to a grounded neutral. Hence, the commutator arrangement is such as to provide an output of energy of substantially square wave formation, which energy is taken off from the commutator by the brush 49 and applied to a filter system comprising resistors 60 and 62, choke coil 61 and condensers 63. The filter system is so constructed that an alternating current of substantially sine wave formation may be obtained through the transformer 66, whose primary is in shunt with the condenser 63 and whose secondary is in circuit between the cathode and the grid of amplifier tube 70.

This amplifier tube is provided with the usual grid leak condenser combination 68 and in the output circuit thereof is a primary winding of another transformer 72. The anode of the tube 70 is fed with direct current from the positive pole of a suitable direct current source, this source having its negative pole grounded.

It will now be seen that the alternating current produced by the filter system will be maintained in synchronism with the rotation of the distributor 19, since the impulses of square wave formation are derived from the rotation of the commutator members 48 and 50, which members are directly driven on the same shaft with that of the distributor 19. This alternating current may be still further amplified if so desired, in which case it may be preferable to employ a push-pull arrangement of electron discharge tubes 74 and 76.

In the push-pull output circuit connected to the anodes of the tubes 74 and 76, I have shown the primary winding of a transformer 78 having a center tap connected to the positive side of a suitable direct current source (not shown), the negative side of this source being understood to be grounded. The grids of the tubes 74 and 76 may be negatively biased with respect to ground, if the cathodes are grounded. The secondary winding of the transformer 78 constitutes the source of a suitable alternating current for driving the synchronous motor 8 and also for driving similar motors connected to different ones of a plurality of automatic transmitters of a multiplex system. The voltmeter 80 may be used to determine the voltage across power lines 86. Depending upon the arrangement of the armature and pole pieces in the synchronous motor 8, it may be possible to run such a motor with its shaft differently phased with respect to the current in the supply lines 86. It is therefore desirable that some indicating means be employed in this system whereby the correct phasing of the motor may be determined. I have, therefore, shown such a means as constituted by a stroboscopic arrangement having a rotating scanning member 6, in combination with a gaseous discharge tube 5 whose luminosity may be viewed either through an opening in the disc 6 or otherwise by mounting the tube itself on the rotative member so that its position when illuminated may be viewed stroboscopically.

The impulses for igniting the tube 5 may be derived through a transformer 4 whose primary winding is grounded at one end and at the other end connected with a midpoint on a resistor 33, the terminals of which are connected across the power line. The source of these momentary impulses for actuating the stroboscope may be a separate commutator arrangement mounted on the shaft 15 along with the distributor 19. This commutator arrangement is such that the brushes 46 and 56 are interconnected for a very brief time interval while the segment 54 passes under the brush 56. The segment 54 may be connected with or integral with a conductive member 52 contacting with the brush 46. Positive current is fed to the brush 46, through the commutator, and through the conductor 82 to a mid-tap on the secondary winding of the transformer 78. The synchronizing impulse so obtained may be fed through the power lines in parallel so as to be taken off at the mid-tap of the resistor 33.

It would, of course, be possible to connect the conductor 82 directly with one terminal of the primary on the transformer 4 instead of transmitting the synchronizing impulse through the power lines. For practical reasons, however, the latter arrangement is preferable, especially where the motor 8 and the stroboscope tube 5 are located at some distance from the distributor and from the power supply unit.

The power supply system and monitoring stroboscope as herein shown provide the advantageous conditions in which each of the motors 8 may be quickly adjusted to synchronous operation with respect to the multiple distributor while each of the transmitters 1, 2, 3, can be correctly phased with respect to the operation of the distributor. Furthermore, the independence of different transmitter units with respect to each other is a matter of practical convenience which has been found to be of considerable importance. The unit 1, whether it be designed for the transmission of teletype signals or for continental Morse code signals, is entirely interchangeable without disturbing any of the other units in the multiplex system.

Referring to Fig. 2, I show a modification of the invention in which a special commutator arrangement is employed for the purpose of obtaining a gradual variation of the control voltage fed to the filter system and thence to the system of push-pull tubes 74 and 76. In this case the commutator is preferably built with 16 segments and has a brush 93 adapted to be driven by means such as the constant speed motor drive unit 36 and motor 16 which were referred to in the foregoing description of Fig. 1. The synchronous motor has four poles in its field. The motor armature makes one revolution during each two cycles of the applied power current.

Figs. 2 and 3 show the angular displacement of the segments around the commutator. The 1st, 5th, 9th and 13th segments are blank, that is, disconnected. The 3rd and 11th segments are directly connected to the positive pole of a direct current source. Adjacent segments on either side of those last mentioned are connected to a tap on a potentiometer 92 for obtaining a positive voltage which is approximately half that of the full voltage above a grounded neutral point. The 7th and 15th segments are directly connected to the negative terminal of the source. The 6th, 8th, 14th and 16th segments are connected to another tap on the potentiometer 92 for obtaining an intermediate voltage between the extreme negative and the grounded neutral point.

The brush 93 as it sweeps over the respective segments of the commutator applies current through the rheostat 58 to the filter system 61, 62, 63 so as to obtain a square wave having a pattern such as indicated in Fig. 3. The filter system is preferably designed for smoothing out this wave into an approximate sine wave. This wave is impressed through the transformer 66 upon the grids of the tubes 74 and 76, thereby operating these tubes in a push-pull manner. The filter rejects the harmonics of the reversal frequency and thus an essentially sine wave current is obtained for operating the push-pull tubes 74 and 76.

The ouput from the push-pull tubes 74, 76 is utilized through the transformer 78 for driving the synchronous motor 8. If desired, a condenser 94 may be connected in parallel with the primary winding of the transformer 78 for obtaining the effect of a tank circuit. This gives the system a fly-wheel effect, particularly where the values of the condenser and of the inductance in the transformer are suitably chosen with this object in view.

Fig. 2 also shows a stroboscope connected with the motor 8 and comprising a rotatable member 6 on which is mounted a glow tube 5. Connections are made to the glow tube through collector rings and brushes leading to the secondary winding of a transformer 4, the primary of which is connected preferably to a mid-tap on an inductive impedance 33a. The impulses for exciting the tube 5 are to be derived in the same manner as shown in Fig. 1 and may be impressed upon the circuit 82 leading to a mid-tap on the secondary of the transformer 78 as shown in Fig. 1.

Referring now to Fig. 4, I show a modification in which for the sake of simplicity no filter system is required. In this case the drive motor 16 rotates the commutator 48, 50 in the same manner as shown in Fig. 1, but the brush 49 is connected directly to the primary of the transformer 72 and thence to ground. The secondary of the transformer 72 is connected to the grids of the tubes 74a and 76a in the same manner as shown in Fig. 1, but these tubes in this case are preferably gas-filled in order that they may, when excited, be conductive of heavy currents for operating the synchronous motor. Such tubes are commonly known as "Thyratrons."

The timing of the operation of the tubes 74a and 76a is synchronized with the passage of the brush 49 over different segments 48 and 50. "Thyratron" tubes when ignited require for their extinction, or de-ionization, that the plate potential be momentarily cut off, or reduced to a negative value with respect to the cathode. In this case it is necessary to employ a capacitor 94 of suitable value to cooperate with the inductance in the transformer 78 so that a tank circuit will be formed which is tuned to the frequency of the alternating current to be generated. Under these conditions a fly-wheel action will be obtained in the tank circuit such as to swing the anode voltage on the tubes 74a and 76a at least to a zero value, and each tube in succession, thereby to quench the ionization in each tube at the proper instant. In other respects the system as shown in Fig. 4 is similar to that of the embodiment shown in Fig. 1.

Referring now to Fig. 5, I show still another embodiment in which, in place of the synchronous motor 8, a direct current motor 98 is employed. The frequency control current is here derived from the source 36 in the same manner as shown in Figs. 1 and 4. It is unnecessary, however, in this case to employ a separate motor for driving the commutator. It is only necessary to regulate the field current by impulses of variable duration dependent upon the duration of each pulse of electronic emission in the tubes 104 and 106.

These tubes have their anodes connected through segments 48 and 50 respectively of the commutator so that the brush 49 may feed current of positive potential to the anodes successively. If the anode of tube 104 is connected to a positive source (not shown) through the field F of the motor 98 before this tube is rendered conductive by a positive impulse on its grid, then the field F will not be excited for the full duration of passage of the brush 49 over one segment of the commutator. Hence the integrated time of excitation of the motor field F will be made dependent upon the successive excitations of the tubes 104 and 106 in response to the control currents derived from the source 36. The speed of the motor will, therefore, be correspondingly regulated. It will be noted in this case that the tubes 104 and 106 may, if desired, be of the gas-filled type, that is to say, they may be "Thyratrons." The control current 36, however, may be very small in comparison with that required for driving the motor.

Various modifications of my invention may be suggested to those skilled in the art upon consideration of the disclosure herein above made, but without departing from the spirit and scope of the invention itself. The breadth of the patent protection sought will, therefore, be understood as limited only by the scope of the claims themselves.

What is claimed is:

1. In a communications system of the class described, a multiplex distributor, a driving motor for said distributor, a polarity-changing commutator also driven by said motor, a filter and amplifier system for producing substantially a sine-wave current from current reversals obtained by said commutator, a plurality of automatic tape transmitters each adapted to feed signals to its allotted portion of said distributor, and synchronous motor means under control of current from said filter and amplifier system for driving each of said tape transmitters.

2. A system as defined in claim 1 in combination with a stroboscope having a scanning member rotatably driven by one of said synchronous motor means and an actuating circuit for said stroboscope receptive of impulses having a fixed frequency - and phase-relation to the rotation of said distributor.

3. In a multiplex telegraph system, a channel-time distributor, a substantially constant speed motor for driving said distributor, means operable in synchronism with said distributor for producing an alternating current from a direct current, means including a telegraph code transmitter for feeding signals to one of the channels of said system through said channel-time distributor, and means including a synchronous motor operatively connected to said transmitter and driven by said alternating current for maintaining synchronism and phase adjustment between said transmitter and said distributor.

4. A device in accordance with claim 3 and means of the stroboscope type operable under the joint control of said distributor driving motor and of said synchronous motor for indicating synchronism and phase adjustment therebetween.

5. In a multiplex telegraph system, a perforated tape transmitter, a synchronous motor for driving said transmitter, means for generating an alternating current for running said motor, a communications channel, a time-division multiplex distributor for periodically connecting said transmitter to said channel, a motor for driving said distributor, means operable by the last said motor for controlling the frequency of said alternating current, means for maintaining the speed of the last said motor substantially constant, and means for indicating the phase adjustment of said transmitter with respect to said distributor.

6. A device in accordance with claim 5 in which the last said means is constituted by an impulse-producing device operable from the distributor-motor, a gaseous discharge tube connected in circuit with said impulse-producing device, and means operable by said synchronous motor for causing said tube to traverse a circular orbit in synchronism with the speed of said distributor.

7. In a system for maintaining synchronism between a telegraph code signal transmitter and a multiplex distributor, a motor for driving said distributor, means for maintaining substantially constant the speed of said motor, means including a push-pull arrangement of gaseous discharge tubes for deriving an alternating current from a direct current, a transformer having its primary winding included in the output circuits of said tubes and having a center-tap connected with a source of direct current potential for powerizing said tubes, a synchronous motor for driving said transmitter, connections for driving the last said motor by current induced in the secondary of said transformer, means for impressing upon the input circuits of said tubes control impulses for determining the frequency of said alternating current, and means operable in synchronism with and in fixed phase relation to said distributor for producing said control impulses.

8. The method of indicating synchronism and phase adjustment between a telegraph code signal transmitter and a multiplex distributor which comprises maintaining substantially constant the speed of said distributor, causing an alternating current to be maintained in synchronism with said distributor, causing said transmitter to be synchronously motor-driven by said alternating current, and producing stroboscopic effect the characteristic of which varies in dependence upon the phase adjustment of said transmitter relative to that of said distributor.

9. In a multiplex telegraph system, means including a distributor for maintaining synchronism between different units of said system, a source of direct current, means under control of said distributor for deriving periodic impulses from said source, means including a system of electron discharge tubes for converting said direct current impulses into an alternating current, a synchronous motor, a transformer for feeding said alternating current to said motor to drive the same, and a telegraph code signalling device constituting one of the units of said system and operable from said synchronous motor.

10. In a multiplex telegraph system, a source of synchronizing impulses, a synchronous motor, means including an oscillation generator having gaseous discharge tubes for delivering aternating current to said motor to drive the same, a multiplex distributor operable independently of said motor, and means responsive to said synchronizing impulses for controlling the frequency of said generator and for driving said distributor at a speed which is a function of said frequency.

11. In a telegraph system, a synchronous motor, a power source coupled to said motor, said source comprising an arrangement of electron discharge tubes having at least a cathode, a grid and an anode in each tube, and means to control the frequency of alternations of the current in said power source, said means including a device for producing periodic impulses and including means for applying said impulses at graduated bias potentials to said grids with respect to said cathodes.

12. In a motor speed control device for a synchronous multiplex telegraph system, a direct current motor, a direct current power source connected to the field and to the armature of said motor, a commutator driven by said motor, a circuit interrupter comprising a gaseous discharge tube arrangement connected to the field of said motor through said commutator, means including a source of periodic impulses for controlling the intermittent discharges in said tube arrangement, thereby to limit the integrated time intervals of excitation of the motor field, and a telegraph code instrument operable by said motor.

13. In a synchronous multiplex telegraph system, a source of synchronizing impulses, means including an oscillation generator having electron discharge tubes for delivering an alternating current, means responsive to said synchronizing impulses for controlling the frequency of said generator, a plurality of motors for driving different operating units of said system, said units being constituted as a channel-time distributor, and means effective to control the speed of said motors, said means being operable in dependence upon the frequency of the alternating current delivered by said generator.

14. In a synchronous multiplex system, a plurality of code impulse telegraph units to be maintained in synchronism and in fixed phase relation, one to another, a separate synchronous motor for driving each unit, a direct-to-alternating current converter having each of said motors in its output circuit, means for maintaining substantially constant the frequency of the alternating current delivered by said converter, a channel-time distributor, a driving connection between said means and said distributor, and circuit connections from each of said telegraph units through said distributor and thence to a communications channel.

15. A system according to claim 14, wherein said converter comprises a push-pull arrangement of grid controlled gaseous discharge tubes, control circuits for said tubes operable from said constant frequency maintaining means, an output circuit including the cathode and anode elements of said tubes and a transformer feeding to said motors, and means including a condenser in shunt with the primary of said transformer for quenching the discharges initiated in said tubes.

16. In a multiplex telegraph system, a source of synchronizing impulses, a continuously rotatable switch, a pair of discharge tubes excitable in a push-pull manner under the joint control of said synchronizing impulses and of currents fed through said switch, a motor for driving one of the operating units of said system, and means operable in dependence upon the action of said discharge tubes for controlling the speed of said motor.

RICHARD E. MATHES.